Figure 1:
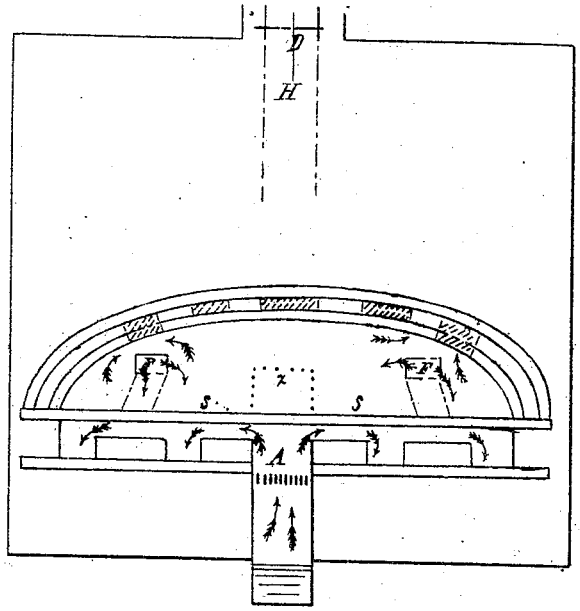

G. F. Wilson.
Making Phosphoric Acid &c.
№ 75326. Patented Mar. 10, 1868.

WITNESSES.
William Hedge
H. H. McGreevy

INVENTOR.
Geo. F. Wilson

G. F. Wilson.
Making Phosphoric Acid &c.
N° 75326. Fig. 3. Patented Mar. 10, 1868
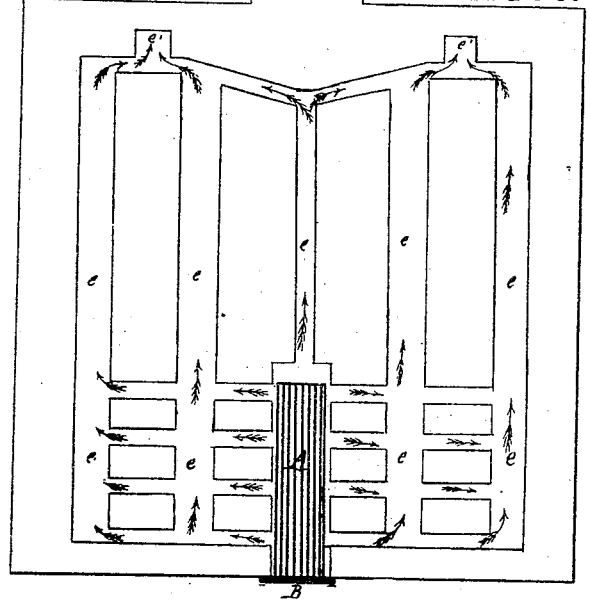
Fig. 4.
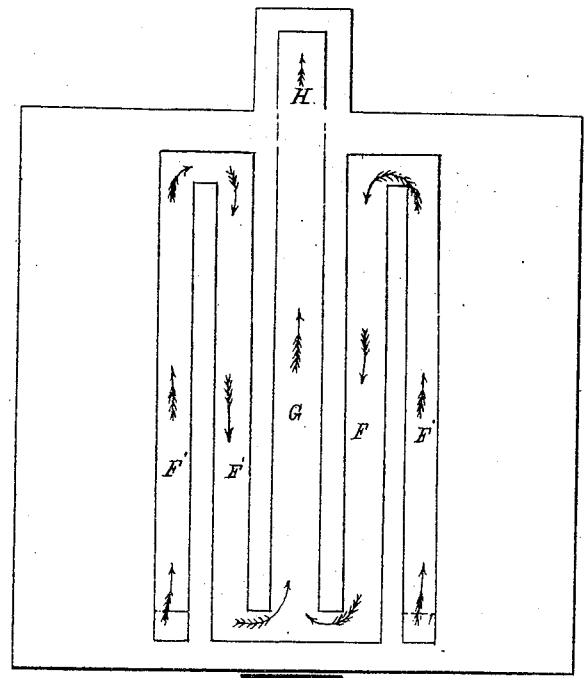
WITNESSES.
William Hedge
H. H. McGrenery
INVENTOR
Geo. F. Wilson

United States Patent Office.

GEORGE F. WILSON, OF EAST PROVIDENCE, RHODE ISLAND.

Letters Patent No. 75,326, dated March 10, 1868.

IMPROVEMENT IN THE PREPARATION OF BONES FOR THE MANUFACTURE OF PHOSPHORIC ACID AND PHOSPHATES.

The Schedule referred to in these Letters Patent and making part of the same.

TO ALL WHOM IT MAY CONCERN:

Be it known that I, GEORGE F. WILSON, of East Providence, in the county of Providence, and State of Rhode Island, have invented a new and improved Process of Burning Bones Gray to Prepare them for the Extraction of Acid Phosphate of Lime; and I hereby declare the following to be a full and exact description thereof, reference being had to the accompanying drawing, and to the letters of reference marked thereon.

The object in this process is to prepare the bone so that, when treated with diluted sulphuric acid, the resulting acid phosphate of lime and sulphate of lime may be readily separated by leaching. In order to this it is essential that the bones should not be burned to whiteness, but to a certain uniform grayness, which experience has shown to be suited to the necessities of manufacture. If the burning stop short of this point there remain sundry objectionable organic bodies, containing large measures of the elements of offensive gases; if it be carried too far, the skeleton, so to speak, of each little fragment breaks down under the action of sulphuric acid, leaving a pulp which rapidly fills the interstices of the felt or other filtering-material at the bottom of the leach, and so arrests or greatly retards the filtration. The desired point is reached when there remains sufficient carbon to preserve the porous texture of the bone.

To accomplish the object proposed, bones are heated in closed cylinders or retorts, and the organic matters distilled till the residue attains the condition substantially as described in my application for a patent for an improvement in the distillation of bones, and of even date herewith. The bones are then quickly raked out into coolers, and excluded from the air to prevent their burning to whiteness, as described in the application above referred to. When cooled, the bones are ground to the fineness required for ordinary bone-black for sugar-refiners. In this condition the bones still contain cyanides, sulphides, and other organic compounds, which render the production of a pure phosphoric acid or acid phosphate of lime practically impossible without further burning. It is necessary that these sources of impurity be removed, and this must be effected without the combustion of the carbon beyond a certain limit.

I find, by experiment, that when the gray bones, after being burned or roasted, are found to contain from ten to twelve per cent. of carbon, the remainder being chiefly phosphate of lime, the best result is produced. To accomplish this the coarse-grained powder is spread evenly, to a depth of three or four inches, over the floor of a furnace heated by flues underneath the bed as well as over the ceiling of the furnace. From time to time the mass of bone-black material is turned rapidly over with the aid of a long shovel or spatula. When the door is opened for turning over the bones the outlet from the furnace is closed, so as to cut off all draught over the surface of the bone. When the whole mass under treatment has assumed the uniform grayish tint, indicating that the proper constitution has been attained, the product is withdrawn from the furnace and laid aside ready for use.

The accompanying drawings illustrate the structure of the furnace.

Figure 1 presents a section parallel to the front of the furnace, with the air-space over the reverberating arch and the flues under the sole.

Figure 2:
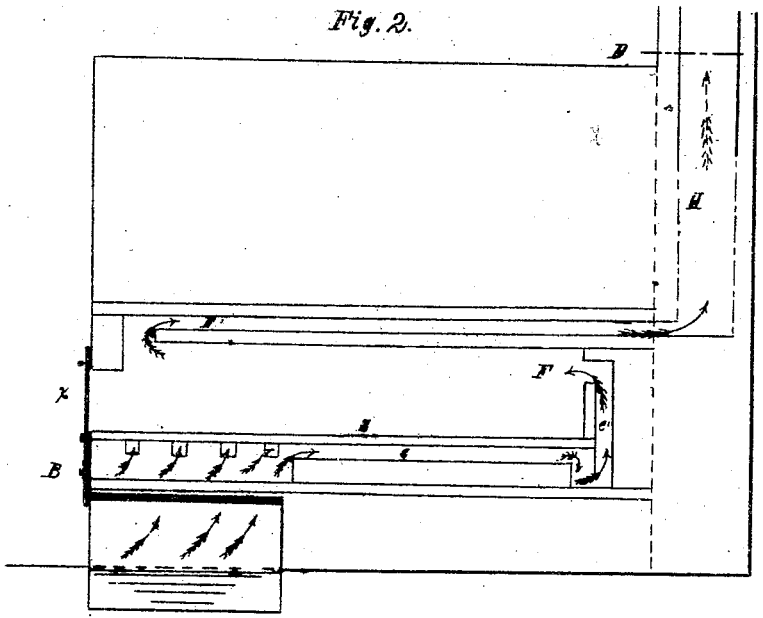

Figure 2 presents a section at right angles to that in fig. 1.

Figure 3 exhibits a plan of the flues under the sole, and

Figure 4 exhibits the flues over the chamber of the furnace.

The mode of operation is as follows: The bone to be treated in the furnace is such as has been previously prepared in accordance with the specification of my application for Letters Patent, of even date herewith, the same being for an improvement in distilling bones, and having been thus prepared and subsequently ground up, the furnace is heated, the damper D closed, the sole S S is covered with ground bone, thus prepared, to a depth of three or four inches. The door X to the furnace-chamber is then closed, and in this condition the whole body of bone is brought to a glow. In a short time the upper surface parts with its surplus organic matters. The damper D is then closed, the door X opened, and the bottom of the layer turned uppermost with the aid of a spatula, as quickly as possible, to present new surface, and, as the spatula is withdrawn, the door X is immediately closed and the damper D opened. This process is continued till the bone, which at the beginning was black, contains only about ten or twelve per cent. of carbon, a result indicated by the grayish appearance of the mass treated. It is then withdrawn from the furnace to be cooled, and is then ready for subsequent processes.

This furnace is contrived and operated so as to enable the operator to remove, as far as possible, the cyanides, sulphides, and other offensive and injurious matters that may be present in the black bone, without removing more of the carbon than is desirable.

What I claim, and desire to secure by Letters Patent of the United States, is—

1. My new and improved process of burning and roasting bones gray, substantially as and for the purposes hereinbefore described, as preliminary to the extraction therefrom of acid phosphate of lime.

2. I claim also, as an improvement in the process of preparing acid phosphate of lime, the use of bone-coal treated substantially as hereinbefore described.

3. I claim, also, the improved furnace, constructed and operating substantially as and for the purposes as hereinbefore described.

GEO. F. WILSON.

Witnesses:
WILLIAM HEDGE,
W. H. McGENERY.